(12) United States Patent
Kato et al.

(10) Patent No.: US 11,541,463 B2
(45) Date of Patent: Jan. 3, 2023

(54) CUTTING TOOL (71) Applicant: TUNGALOY CORPORATION, Fukushima (JP)

(72) Inventors: Tatsumi Kato, Iwaki (JP); Jun Otsuka, Iwaki (JP); Takehiro Ida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/333,422

(22) Filed: May 28, 2021

(65) Prior Publication Data
US 2021/0370412 A1 Dec. 2, 2021

(30) Foreign Application Priority Data
May 29, 2020 (JP) .............................. JP2020-093930

(51) Int. Cl.
*B23B 27/16* (2006.01)
(52) U.S. Cl.
CPC .... *B23B 27/1662* (2013.01); *B23B 2205/045* (2013.01); *Y10T 407/2278* (2015.01)
(58) Field of Classification Search
CPC .......... B23B 2205/045; B23B 2205/04; B23B 2205/00; B23B 2260/096; B23B 27/1662;
(Continued)

(56) References Cited

U.S. PATENT DOCUMENTS 3,316,616 A * 5/1967 Milewski ............ B23B 27/1677
407/105

3,491,421 A * 1/1970 Williams ............ B23B 27/1662
407/105
(Continued)

FOREIGN PATENT DOCUMENTS

DE 2544877 A1 * 4/1976
FR 1596370 A * 6/1970
(Continued)

OTHER PUBLICATIONS

Description DE2544877A1 (translation) obtained at https://worldwide.espacenet.com/ (last visited May 17, 2022).*

*Primary Examiner* — Ryan Rufo
(74) *Attorney, Agent, or Firm* — Studebaker & Brackett PC (57) ABSTRACT

[Problem] A cutting tool to which a cutting insert can be firmly fixed is provided.
[Means for Resolution] Provided is a cutting tool where a replaceable cutting insert having a hole for fixing is mountable. The cutting tool includes a main body portion, a lever, a pin, and a screw. The main body portion has a placement surface where the cutting insert is placed, a side wall coming into contact with at least one side surface of the cutting insert, a lever accommodating hole, a pin accommodating hole, and a screw accommodating hole. The screw presses a rear end portion of the pin by being tightened. A tip portion of the pin presses the lever by the rear end portion being pressed against the screw. The lever has a concave surface configured by a line segment parallel to a reference axis and, by the concave surface being pressed against the tip portion of the pin, a head protruding into the hole of the placed cutting insert presses an inner wall of the hole and presses and fixes the cutting insert against and to the placement surface and the side wall.

5 Claims, 9 Drawing Sheets (58) Field of Classification Search
CPC ............ B23B 27/1622; B23B 27/1644; B23B 27/1614; B23B 27/1618; B23B 27/1677; Y10T 407/2278; Y10T 407/2276; Y10T 407/2282
USPC ......................................................... 407/105
See application file for complete search history.

(56) References Cited

U.S. PATENT DOCUMENTS

| | | | | |
|---|---|---|---|---|
| 3,787,941 | A * | 1/1974 | Novkov | B23B 27/1622 407/113 |
| 4,632,593 | A * | 12/1986 | Stashko | B23B 27/1622 407/104 |
| 6,599,060 | B2 * | 7/2003 | Hecht | B23B 27/1662 407/104 |
| 7,347,650 | B2 * | 3/2008 | Tipu | B23B 27/1662 407/66 |
| 7,431,539 | B2 * | 10/2008 | Erickson | B23B 27/1662 407/112 |
| 2003/0031519 | A1 * | 2/2003 | Hecht | B23B 27/1662 407/105 |
| 2015/0151364 | A1 | 6/2015 | Choi et al. | |

FOREIGN PATENT DOCUMENTS

| | | |
|---|---|---|
| JP | S53-006989 A | 1/1978 |
| JP | 2004-538163 A | 12/2004 |
| JP | 2015-523229 A | 8/2015 |
| WO | 2013/073690 A1 | 5/2013 |

\* cited by examiner

CUTTING TOOL

TECHNICAL FIELD

The present invention relates to a cutting tool.

BACKGROUND ART

A technique for fixing a replaceable cutting insert to a cutting tool main body with an internally provided lever is known (see, for example, Patent Document 1). According to Patent Document 1, an inclined surface is provided in a through hole of the cutting insert and a protruding portion provided on the lever is pressed against the inclined surface. As a result, a force is generated to pull the cutting insert into the placement surface of the cutting tool main body.

CITATION LIST

Patent Document

Patent Document 1: JP-T-2004-538163 (the term "JP-T" as used herein means a published Japanese translation of a PCT patent application)

SUMMARY OF THE INVENTION

Technical Problem

In a form of use for enhancing the efficiency of use of the cutting insert, cutting edges are provided on the ridgelines of both surfaces of the cutting insert and the cutting insert is turned over and the other surface side is used when one surface side reaches the limit of use. The cutting insert in such an aspect of use generally has the through hole of a cylindrical surface.

However, in order to appropriately exert the force to pull the cutting insert into the placement surface of the cutting tool main body with the lever with respect to the through hole of the cylindrical surface, the lever needs to be tilted accurately and as designed. However, it is difficult to stabilize the contact point between a pin (plunger) pressing the lever and the lever at one point and it is assumed that the tilting direction of the lever varies with fixing work and an appropriate pulling force cannot be obtained as a result. In other words, the cutting insert may not be firmly fixed to the cutting tool.

The invention has been made to solve such a problem and provides a cutting tool to which a cutting insert can be firmly fixed.

Solution to Problem

The cutting tool according to one aspect of the invention is a cutting tool where a replaceable cutting insert having a hole for fixing is mountable. The cutting tool includes a main body portion, a lever, a pin, and a screw. The main body portion has a placement surface where the cutting insert is placed such that a central axis of the hole becomes vertical, a side wall coming into contact with at least one side surface of the cutting insert when the cutting insert is placed on the placement surface, a lever accommodating hole accommodating a part of the lever and continuous with the hole in a case where the cutting insert is placed on the placement surface, a pin accommodating hole accommodating a part of the pin and communicating with a side surface of the lever accommodating hole, and a screw accommodating hole accommodating at least a part of the screw, provided with a female screw portion screwed with a male screw portion of the screw at least in part, and communicating with the pin accommodating hole. The screw presses a rear end portion of the pin by being tightened. A tip portion of the pin presses the lever by the rear end portion being pressed against the screw. The lever has a concave surface configured by a line segment parallel to a reference axis and, by the concave surface being pressed against the tip portion of the pin, a head protruding into the hole of the placed cutting insert presses an inner wall of the hole and presses and fixes the cutting insert against and to the placement surface and the side wall.

In this manner, the tip portion of the pin comes into contact with the concave surface configured by the line segment parallel to the reference axis. As a result, the lever stably tilts in a planned direction even if the contact point deviates in the line segment direction. In other words, the cutting insert can be firmly pressed against the side wall or the placement surface and can be firmly fixed.

In the cutting tool described above, the reference axis may be tilted in a direction in which a side of the head becomes far from the pin with respect to a central axis of the lever. With such an axial relationship, the pressing force of the pin can be more effectively converted into the force to pull the cutting insert into the placement surface of the cutting tool main body. At this time, a central axis of the pin may be tilted in a direction in which a side of the tip portion becomes far from the head with respect to a horizontal axis orthogonal to a vertical axis of the lever accommodating hole. By such an axial relationship being further adopted, the proportion of the downward component of the force that pushes the lever can be increased and the lever can become hardly disengageable.

In addition, in the cutting tool described above, the lever may have a projecting portion between the head and the concave surface and the projecting portion may protrude to a side opposite to a side where the concave surface is provided with respect to the central axis of the lever. When such a projecting portion is provided, the projecting portion stabilizes as a fulcrum of the lever acting as a lever, and thus the tilting direction of the lever becomes more stable.

In addition, in the cutting tool described above, the lever may be provided with a notch portion having a width larger than a diameter of the tip portion of the pin from a concave portion provided with the concave surface to a bottom surface of the lever. If such a notch portion is provided, the lever can be easily pulled out of the lever accommodating hole even without the pin as a whole being retracted to the pin accommodating hole. In other words, cutting tool maintenance work is facilitated.

Advantageous Effects of the Invention

According to the invention, a cutting tool to which a cutting insert can be firmly fixed can be provided.

MODE FOR CARRYING OUT THE INVENTION

An embodiment of the invention will be described with reference to the accompanying drawings. It should be noted that those having the same reference numerals in the drawings have the same or similar configurations.

Figure 1:
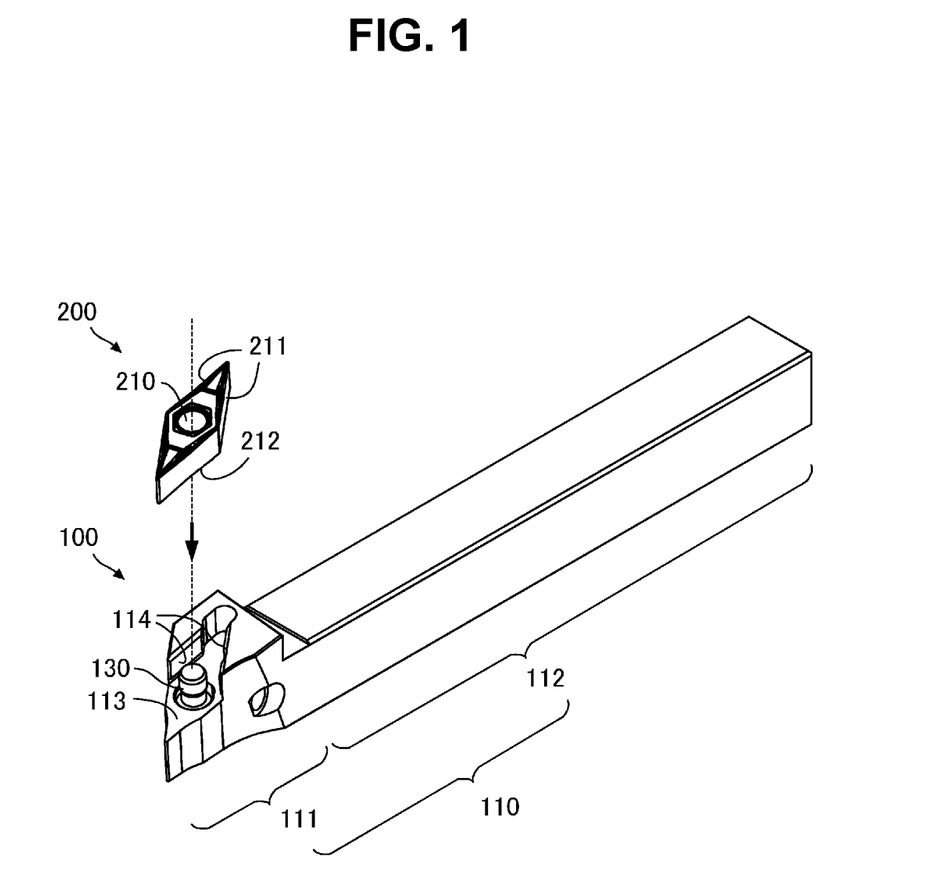
FIG. 1 is an overall perspective view of a cutting tool according to the present embodiment.

FIG. 1 is an overall perspective view of a cutting tool 100 according to the present embodiment. The cutting tool 100 in the present embodiment is a cutting tool for a lathe. A main body portion 110 has a head portion 111 where a cutting insert 200 is mounted and a shank portion 112, which is a handle part fixed to a lathe chuck.

The head portion 111 has a recessed placement portion such that the cutting insert 200 can be accommodated and mounted. The placement portion is mainly formed by a placement surface 113 where the cutting insert 200 is placed and two side walls 114 provided on the shank portion 112 side. In addition, a part of a lever 130 protrudes, so as to be tiltable, from the vicinity of the middle of the placement surface 113.

The cutting insert 200 is, for example, a replaceable cutting edge tip having a diamond shape as illustrated in the drawing. The cutting insert 200 according to the present embodiment has cutting edges on the ridgeline on the upper surface side and the ridgeline on the lower surface side, respectively. Accordingly, when the cutting ability of one of the cutting edges is reduced and the limit of use is reached, a user can use the other cutting edge by turning over and re-mounting the cutting insert 200. Then, when the other cutting edge also reaches the limit of use, the cutting insert 200 is removed from the cutting tool 100 and replaced with a new cutting insert 200. It should be noted that the cutting insert may be a cutting insert having cutting edges on two ridgelines on the upper surface side and two ridgelines on the lower surface side. Such cutting inserts are used twice on the upper surface side and twice on the lower surface side.

The cutting insert 200 has a through hole 210 vertically penetrating the vicinity of the middle portion, two abutting surfaces 211 as side surfaces abutting against the side walls 114 when fixed, and a bottom surface 212 abutting against the placement surface 113. When the protruding portion of the lever 130 is housed in the through hole 210 and placed on the placement surface 113, the central axis of the through hole 210 becomes perpendicular to the placement surface 113. In other words, even when the cutting insert 200 is turned over and the opposite surface is placed on the placement surface 113 as the bottom surface 212, the central axis of the through hole 210 becomes perpendicular to the placement surface 113. As will be described in detail later, when the lever 130 is tilted, the abutting surface 211 is pressed against the side wall 114, the bottom surface 212 is pressed against the placement surface 113, and the cutting insert 200 is firmly fixed to the cutting tool 100. It should be noted that a part of the side surface may be the part of the cutting insert 200 that abuts against the side wall 114. For example, if the abutting surface 211 is pressed against the upper ridgeline of the side wall 114, both come into line contact with each other. In addition, both come into point contact with each other in a case where the side wall 114 or the abutting surface 211 is provided with a projecting portion.

Although the cutting tool 100 for mounting the diamond-shaped cutting insert 200 is described in the present embodiment, a cutting insert having another shape such as a triangle, a rectangle, and a circle may be mountable to the cutting tool. In any case, the cutting insert has a similar hole near the middle portion and an abutting surface and a bottom surface pressed against the cutting tool. The cutting tool may be provided with a placement surface and a side wall corresponding thereto. It should be noted that the number of side walls abutting against the abutting surface may be one or three or more.

Figure 2:
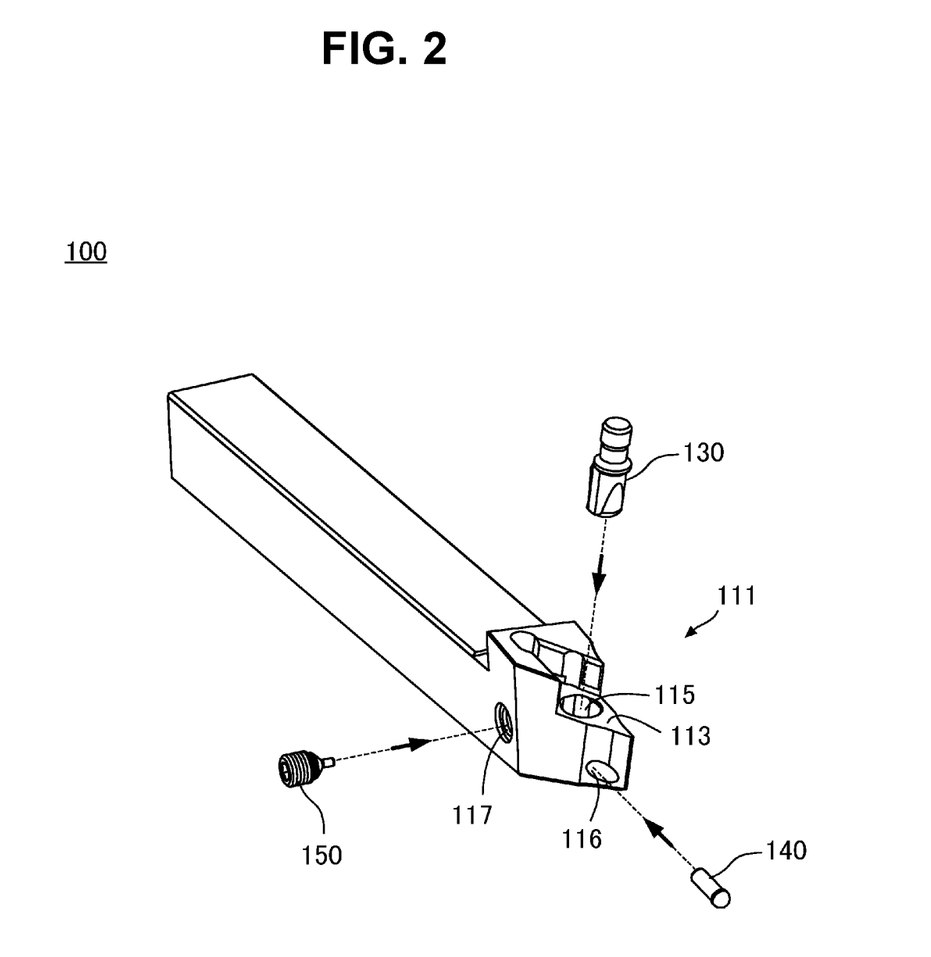
FIG. 2 is an exploded perspective view illustrating the main elements of a head portion.

FIG. 2 is an exploded perspective view illustrating the main elements of the head portion 111. The lever 130, a pin 140, and a screw 150 are incorporated into the head portion 111. Accordingly, the head portion 111 is provided with a lever accommodating hole 115 continuous with the through hole 210 of the cutting insert 200 in a case where the cutting insert 200 is placed on the placement surface 113. The lever accommodating hole 115 accommodates a part of the lever 130.

In addition, a tip portion of the head portion 111 is provided with a pin introduction hole 116 for accommodating the pin 140 in a pin accommodating hole (described later). The pin 140 is incorporated into the head portion 111 from the pin introduction hole 116. A screw accommodating hole 117 accommodating the screw 150 is provided in a side portion of the head portion 111. A female screw portion is provided on the inner periphery of the screw accommodating hole 117, and the screw 150 is incorporated into the head portion 111 while being screwed with the female screw portion.

Figure 3:
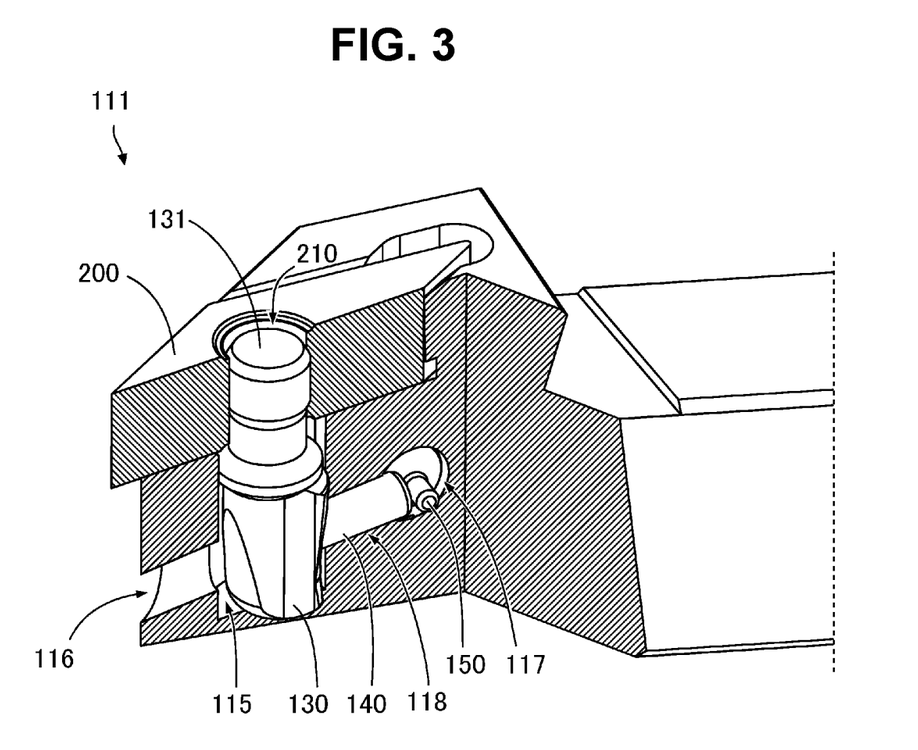
FIG. 3 is a partial cross-sectional view of the head portion.

FIG. 3 is a partial cross-sectional view of the head portion 111. Specifically, FIG. 3 is a cross-sectional view in which the mounted cutting insert 200 and the head portion 111 are cut and the lever 130, the pin 140, and the screw 150 incorporated in the head portion 111 are illustrated without being cut.

The lever accommodating hole 115 is a bottomed hole having the side surface of a cylindrical surface. As described above, the lever accommodating hole 115 is continuous with the through hole 210 of the mounted cutting insert 200 and the lever 130 is entirely accommodated therein. More specifically, in a case where the lever 130 is incorporated in the lever accommodating hole 115, a head 131 protrudes from the lever accommodating hole 115 and the through hole 210 accommodates the protruding head 131. The lever accommodating hole 115 has an internal space to the extent that the lever 130 is tiltable when the cutting insert 200 is fixed.

The pin introduction hole 116 communicates with the side surface of the lever accommodating hole 115 in the head portion 111, and a pin accommodating hole 118 is provided on an extension line thereof. The pin 140 introduced from the pin introduction hole 116 is incorporated into the pin accommodating hole 118. Although the pin introduction hole 116 and the pin accommodating hole 118 are separated by the lever accommodating hole 115, the pin introduction hole 116 and the pin accommodating hole 118 are formed as a continuous hole in substance. However, the tip portion of the pin 140 is formed to be slightly larger than the body of the pin 140 as will be described in detail later, and thus the inner diameter of the pin introduction hole 116 through which the tip portion is passed is larger than the inner diameter of the pin accommodating hole 118 that does not accommodate the tip portion. The inner diameter of the pin accommodating hole 118 is set to be slightly larger than the diameter of the body of the pin 140 such that the body of the pin 140 is slidable.

The screw accommodating hole 117 communicates with the rear end of the pin accommodating hole 118, which is on the side opposite to the tip that communicates with the lever accommodating hole 115. The female screw portion is formed on the inner peripheral surface of the screw accommodating hole 117 as described above, and the screw 150 enters the head portion 111 while being screwed with the female screw portion by being rotated and then comes into contact with the rear end portion of the pin 140 protruding into the screw accommodating hole 117. FIG. 3 illustrates how the screw 150 is in contact with the rear end portion of the pin 140.

Figure 4:
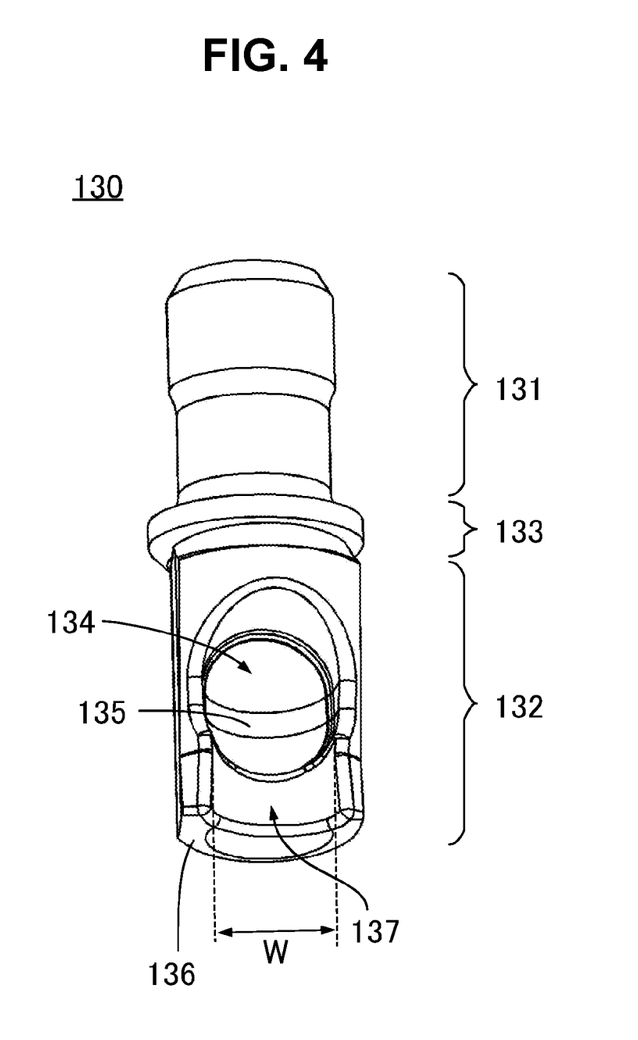
FIG. 4 is a perspective view of a lever.

FIG. 4 is a perspective view of the lever 130. The lever 130 includes three parts of the head 131, a main body portion 132, and a flange portion 133. The head 131 enters the through hole 210 of the cutting insert 200 as described above and functions as a pressing portion pressing the inner wall of the through hole 210.

The main body portion 132 has a cylindrical shape slightly thicker than the head 131, and a large concave portion 134 is provided near the middle thereof. The concave portion 134 has a concave surface 135 arranged on the inner surface thereof that is a cylindrical surface. The concave surface 135 will be described in detail later. In addition, the main body portion 132 has a notch portion 137 partially cut out over a width W from below the concave portion 134 to a bottom surface 136 of the main body portion 132.

The flange portion 133 is an annular flange portion formed between the head 131 and the main body portion 132 and protruding from the cylindrical surface of the main body portion 132. The flange portion 133, which will be described in detail later, comes into contact with the inner peripheral surface of the lever accommodating hole 115 and functions as a fulcrum of the lever 130 acting as a lever.

Figure 5:
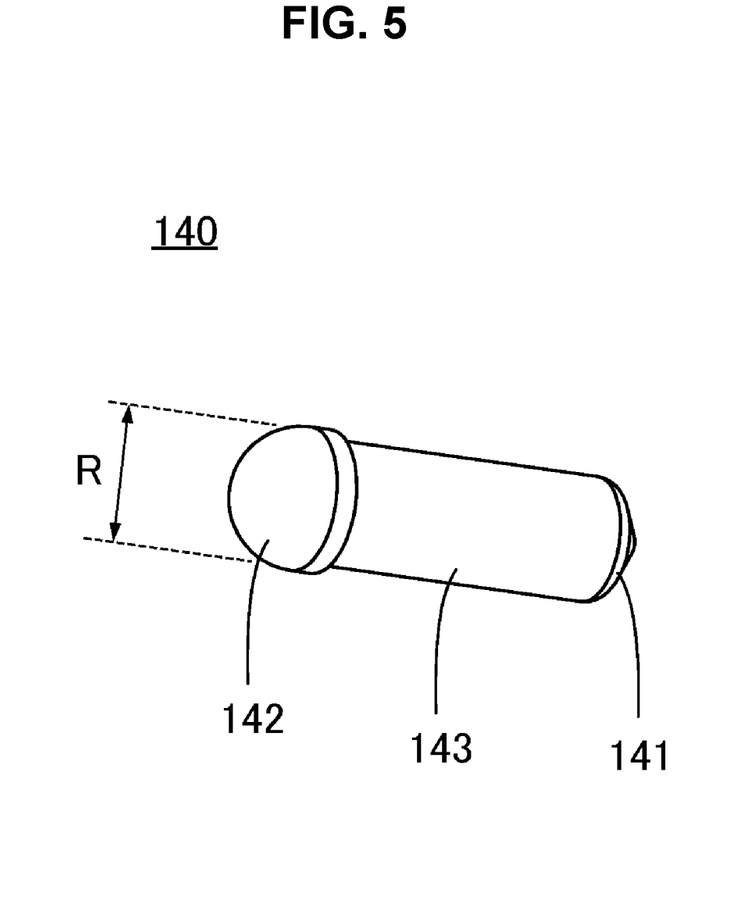
FIG. 5 is a perspective view of a pin.

FIG. 5 is a perspective view of the pin 140. The pin 140 has a rear end portion 141 pressed by the screw 150, a tip portion 142 pressing the lever 130, and a body 143 as an intermediate portion between the rear end portion 141 and the tip portion 142. The rear end portion 141 is formed in a conical shape or a hemispherical shape so as to be susceptible to the pressing force of the screw 150. As described above, the rear end portion 141 is disposed so as to protrude into the screw accommodating hole 117.

The tip portion 142 as a whole is formed in a hemispherical shape having a diameter R, which is larger than the diameter of the body 143. The tip portion 142 is inserted into and disposed in the concave portion 134 such that a part of the hemispherical part comes into contact with the concave surface 135 of the lever 130. The body 143 is accommodated in the pin accommodating hole 118, and the body 143 slides in the direction of the lever 130 when the rear end portion 141 is pressed.

Figure 6:
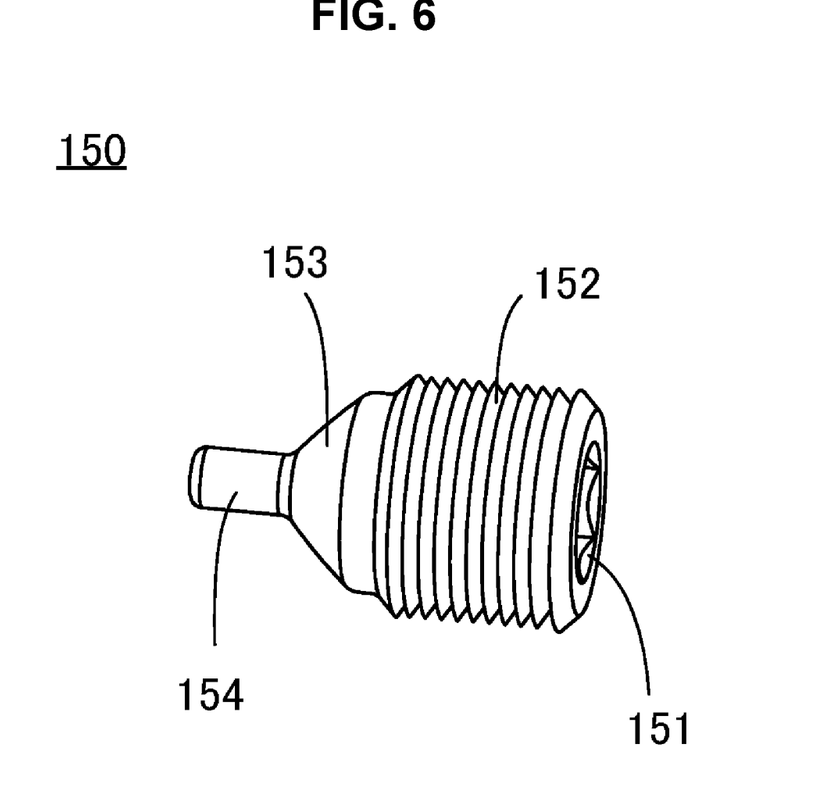
FIG. 6 is a perspective view of a screw.

FIG. 6 is a perspective view of the screw 150. The screw 150 has a wrench hole 151, a male screw portion 152, an engagement surface 153, and a protrusion 154. The wrench hole 151 is provided in an end surface of the screw 150, and the entire screw 150 moves back and forth in the screw accommodating hole 117 by a wrench being inserted and rotated. The male screw portion 152 is screwed with the female screw portion provided in the screw accommodating hole 117. The engagement surface 153 is the surface of the conical portion that is continuous from an end of the male screw portion 152. The engagement surface 153 has a function of coming into contact with the rear end portion 141 of the pin 140 and transmitting the tightening force of the screw 150 to the pin 140. The protrusion 154 has a function of preventing the pin 140 from excessively entering the screw accommodating hole 117 when the screw 150 is retracted and the engagement surface 153 is separated from the rear end portion 141 of the pin 140.

Figure 7:
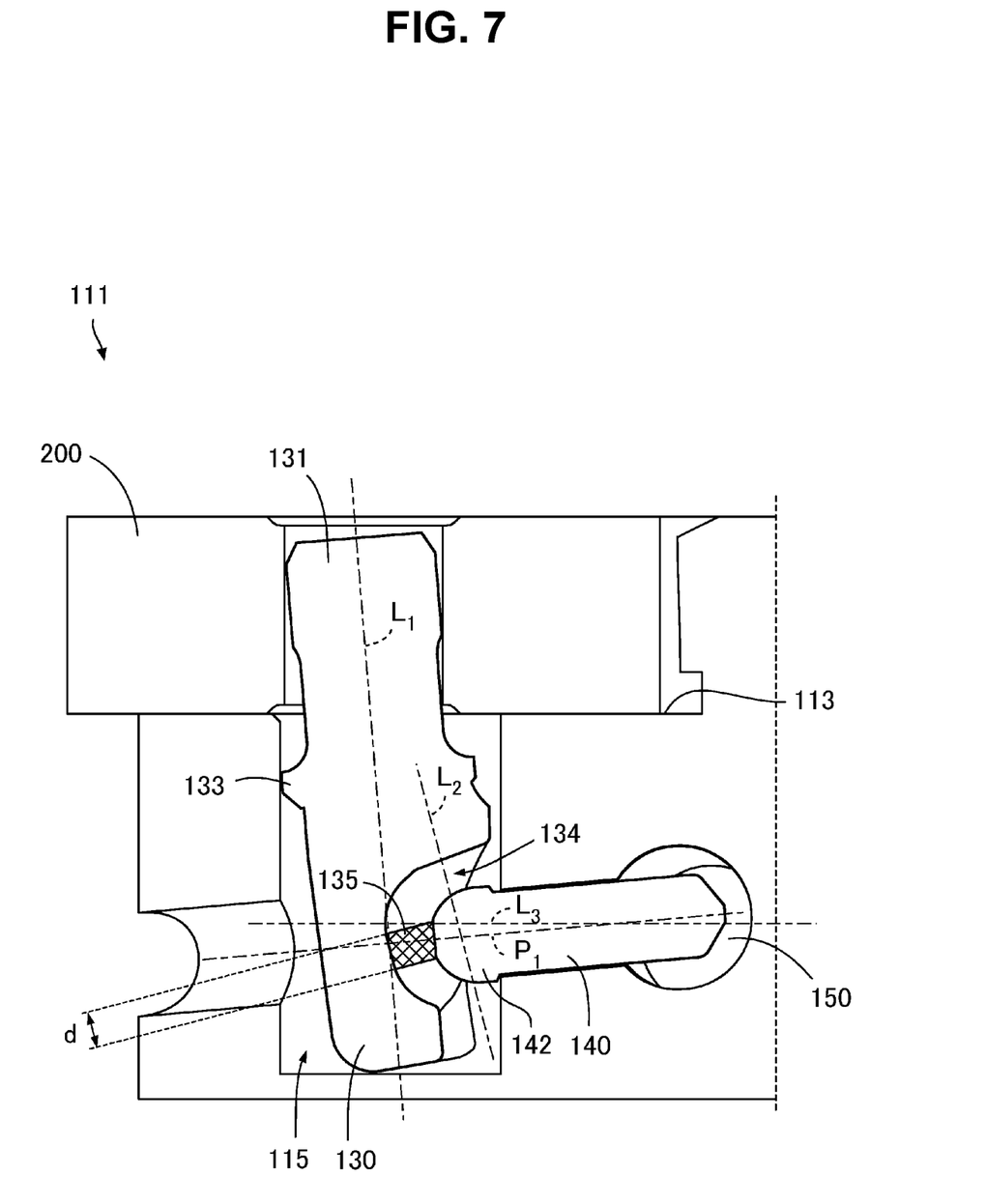
FIG. 7 is a partial cross-sectional view illustrating a state before fixing by means of the lever.

FIG. 7 is a partial cross-sectional view illustrating a state where the cutting insert 200 is yet to be fixed by the lever 130. More specifically, FIG. 7 is a diagram illustrating a state where a user places the cutting insert 200 on the placement surface 113 and then is about to tighten the screw 150. In FIG. 7, the lever 130 and the pin 140 are also illustrated in cross section unlike in FIG. 3. $L_1$ is the central axis of the lever 130 having a columnar shape as a whole. $P_1$ is the central axis of the pin 140, which also has a columnar shape as a whole. In other words, FIG. 7 is a cross-sectional view including the central axis of the lever 130 and the central axis of the pin 140. It should be noted that cross-sectional hatching is omitted in FIG. 7 so that the disposition relationship between the elements can be understood with ease.

A reference axis $L_2$ is a reference axis of the cross-hatched concave surface 135, and the concave surface 135 is formed as a part of the cylindrical surface having the reference axis $L_2$ as the central axis thereof. In other words, the concave surface 135 is a set of line segments equidistant from the reference axis $L_2$ and parallel to the reference axis $L_2$. The tip portion 142 of the pin 140 comes into contact at any position on the concave surface 135 when the rear end portion 141 is pressed by the screw 150.

If the contact point is not a cylindrical surface such as the concave surface 135 but a cubic curved surface such as a spherical surface where the normal vector changes, the direction of action of the pressing force deviates in a case where the contact point deviates from a planned position by being affected by, for example, the gap between the body 143 of the pin 140 and the pin accommodating hole 118. In other words, the lever 130 does not fall in a planned direction. Then, the force to pull the cutting insert 200 into the placement surface 113 cannot be appropriately exerted and the cutting insert 200 may be easily disengaged.

On the other hand, if the concave surface 135 is formed as a part of such a cylindrical surface, the lever 130 stably tilts toward a predetermined fixed direction even if the point of contact with the pin 140 deviates in the direction of the line segment on the concave surface 135 (direction parallel to the reference axis $L_2$). Further, even in the tilting process of the lever 130, the contact point moves along the line segment, and thus the deviation in the direction of tilting is significantly suppressed. Accordingly, the force to pull the cutting insert 200 into the placement surface 113 can be exerted as designed and the cutting insert 200 can be firmly fixed to the cutting tool 100.

It should be noted that a height d of the concave surface 135 is defined as a range in which the tip portion 142 of the pin 140 may come into contact. For example, the height d is determined in view of the size of the gap between the body 143 of the pin 140 and the pin accommodating hole 118 as described above or the distance of movement of the contact point entailed by the tilting of the lever 130. It should be noted that the concave surface 135 in the present embodiment is formed as a part of the cylindrical surface and yet surface configurations leading to such an effect is not limited thereto. For example, the concave surface 135 may be a set of strip-shaped planes along the reference axis $L_2$. In other words, the concave surface 135 may be a concave surface configured by a line segment parallel to the reference axis $L_2$.

When the concave surface 135 is pressed against the tip portion 142 of the pin 140, the lever 130 functions as a lever having the contact point between the flange portion 133 and the lever accommodating hole 115 as a fulcrum. Since the flange portion 133 protruding toward the lever accommodating hole 115 is used as a fulcrum in this manner, the position of the fulcrum as a lever is stable and the lever 130 tilts more stably toward a predetermined fixed direction. It should be noted that the projecting portion that functions as a fulcrum does not have to be a flange surrounding the entire circumference of the lever 130 and may be a projecting portion protruding to the side opposite to the side where the concave surface 135 is provided with respect to the central axis $L_1$ of the lever 130.

The reference axis $L_2$ is tilted in the direction in which the side of the head 131 becomes far from the pin 140 with respect to the central axis $L_1$ of the lever. In other words, the reference axis $L_2$ is tilted so as to intersect with the central axis $L_1$ on the side that is closer to the head 131 than the position where the concave surface 135 is provided. By the reference axis $L_2$ being tilted in this manner, the normal of the concave surface 135 at the contact point can be directed upward from the horizontal, and thus the pressing force of the pin 140 can be more effectively converted into the force to pull the cutting insert 200 into the placement surface 113.

In addition, the central axis $P_1$ of the pin 140 is tilted in the direction in which the side of the tip portion 142 becomes far from the head 131 with respect to a horizontal axis $L_3$ orthogonal to the vertical axis of the lever accommodating hole 115. By the central axis $P_1$ being tilted in this manner, the proportion of the downward component of the force that pushes the lever 130 can be increased and the lever 130 can become hardly disengageable. It should be noted that such a tilt leads to an increase in the upward component of the pressing force from the screw 150 that is received by the rear end portion 141 of the pin 140, and thus the component in the downward direction in which the pin 140 pushes the lever 130 can be more reliably secured.

Figure 8:
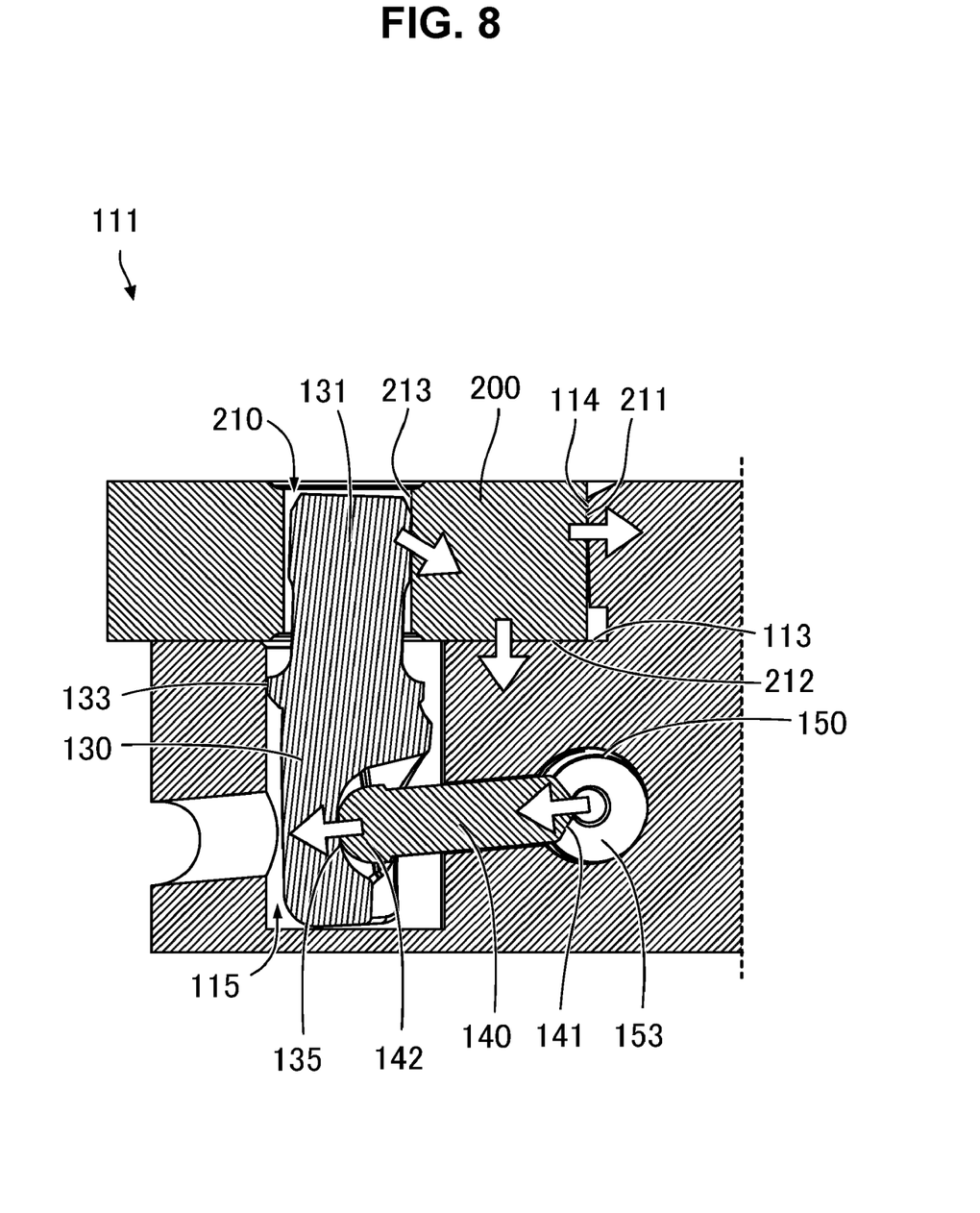
FIG. 8 is a partial cross-sectional view illustrating a state after the fixing by means of the lever.

FIG. 8 is a partial cross-sectional view illustrating a state after the cutting insert 200 is fixed by the lever 130. More specifically, FIG. 8 is a diagram illustrating a state after a user tightens the screw 150 from the state of FIG. 7. However, in FIG. 8, the cross section is hatched unlike in FIG. 7. In addition, the direction of action of the force is indicated by a white arrow.

When the screw 150 is tightened, the engagement surface 153 of the screw 150 presses the rear end portion 141 of the pin 140. In response to this pressing force, the tip portion 142 of the pin 140 presses the concave surface 135 of the lever 130. Then, the lever 130 is inclined with the contact point between the tip portion 142 of the pin 140 and the concave surface 135 serving as a force point and the contact point between the lever accommodating hole 115 and the flange portion 133 serving as a fulcrum and the head 131 comes into contact with an inner wall 213 of the through hole 210. The contact point between the head 131 and the inner wall 213 acts as a point of action, and the acting force functions as a pressing force that presses the bottom surface 212 of the cutting insert 200 against the placement surface 113 and the abutting surface 211 against the side wall 114. The cutting insert 200 is firmly fixed to the cutting tool 100 by this pressing force.

Figure 9:
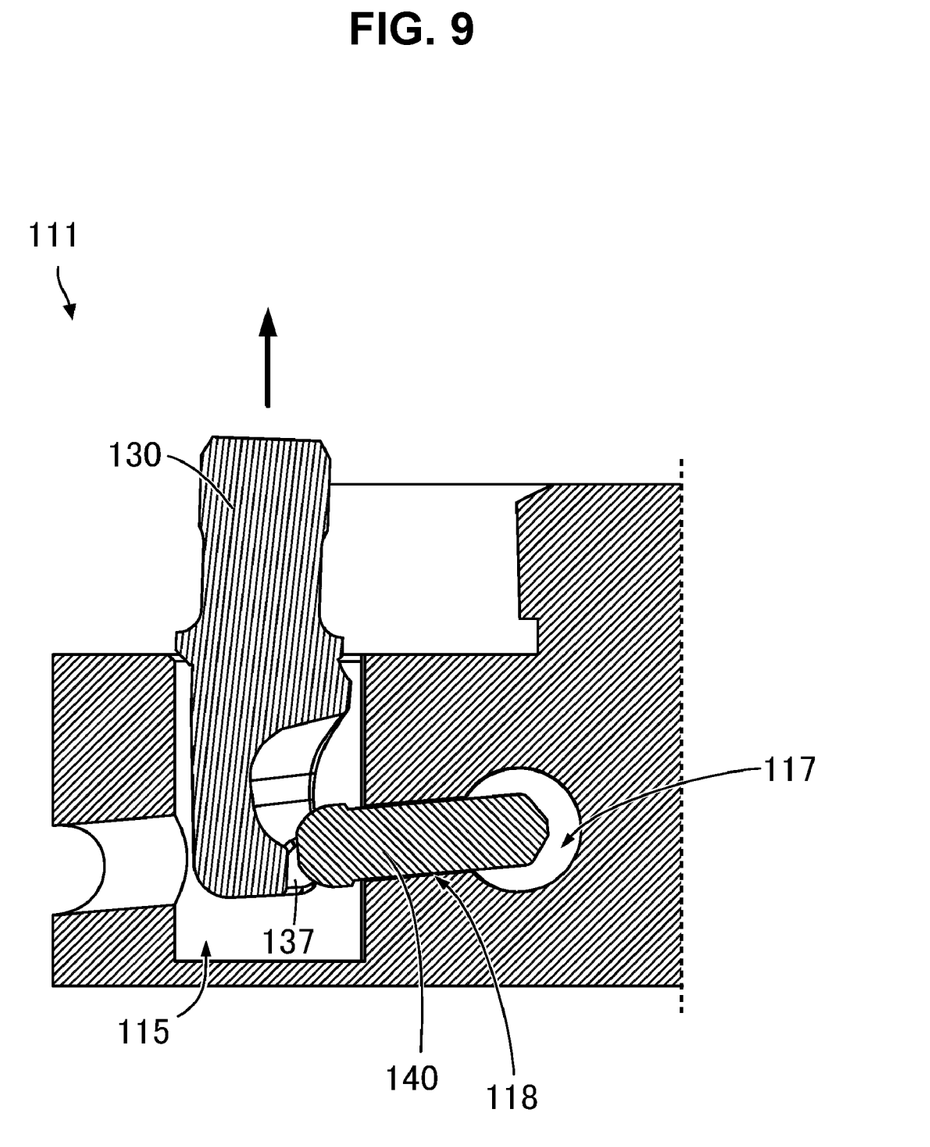
FIG. 9 is a partial cross-sectional view illustrating how the lever is removed.

As for the cutting tool 100, the lever 130, the pin 140, and the screw 150 can be replaced as needed. FIG. 9 is a partial cross-sectional view illustrating how the lever 130 is removed. For the lever 130 to be removed, the screw 150 is removed first from the screw accommodating hole 117 and then the pin 140 is slid and retracted in the direction of the screw accommodating hole 117.

As described above, the lever 130 is provided with the notch portion 137 and the width W thereof is set to be larger than the diameter R of the tip portion 142 of the pin 140. Accordingly, the pin 140 can be removed upward by the tip portion 142 of the pin 140 being passed through the notch portion 137. With such a configuration, the lever 130 can be easily pulled out of the lever accommodating hole 115 even without the pin 140 as a whole being retracted to the pin accommodating hole 118. In other words, maintenance work for the cutting tool 100 is facilitated. In addition, the lever accommodating hole 115 is reduced in size and the head portion 111 is reduced in size as a result.

The present embodiment described above is a case where the through hole 210 penetrating the upper surface and the lower surface is the hole for fixing that is provided in the cutting insert 200. However, in the fixing structure by means of the lever described above, the above effect is obtained insofar as the inner surface of the hole of the cutting insert is a vertical surface. In other words, the hole of the cutting insert may be a bottomed hole instead of a through hole. For example, the cutting insert may have a bottomed hole provided from the lower surface side without penetrating the upper surface and cutting edges may be provided on two ridgelines on the upper surface side. When the cutting edge provided on one of the ridgelines in such a cutting insert reaches the limit of use, the cutting edge provided on the other ridgeline can be used by the lever being loosened and the cutting insert being rotated by 180 degrees around the central axis of the hole and re-mounted.

REFERENCE SIGNS LIST

100 Cutting tool
110 Main body portion
111 Head portion
112 Shank portion
113 Placement surface
114 Side wall
115 Lever accommodating hole
116 Pin introduction hole
117 Screw accommodating hole
118 Pin accommodating hole
130 Lever
131 Head
132 Main body portion
133 Flange portion
134 Concave portion
135 Concave surface
136 Bottom surface
137 Notch portion
140 Pin
141 Rear end portion
142 Tip portion
143 Body
150 Screw
151 Wrench hole
152 Male screw portion
153 Engagement surface
154 Protrusion
200 Cutting insert
210 Through hole
211 Abutting surface 212 Bottom surface
213 Inner wall

The invention claimed is:

1. A cutting tool where a replaceable cutting insert having a hole for fixing is mountable, the cutting tool comprising a main body portion, a lever, a pin, and a screw, wherein
the main body portion includes:
a placement surface where the cutting insert is capable of being placed such that a central axis of the hole becomes vertical;
a side wall coming into contact with at least one side surface of the cutting insert when the cutting insert is placed on the placement surface;
a lever accommodating hole accommodating a part of the lever and continuous with the hole when the cutting insert is placed on the placement surface;
a pin accommodating hole accommodating a part of the pin and communicating with a side surface of the lever accommodating hole; and
a screw accommodating hole accommodating at least a part of the screw, provided with a female screw portion screwed with a male screw portion of the screw at least in part, and communicating with the pin accommodating hole, wherein
the screw presses a rear end portion of the pin when the screw is being tightened,
a tip portion of the pin presses the lever by the rear end portion being pressed against the screw,
the lever has a partially cylindrical concave surface, the concave surface having a reference axis as a central axis thereof, the concave surface including a line segment parallel to the reference axis,
when the cutting insert is placed on the placement surface and the concave surface is pressed against the tip portion of the pin, a head of the lever protruding into the hole of the placed cutting insert presses an inner wall of the hole to press and fix the cutting insert against and to the placement surface and the side wall,
the line segment is an axis along which a contact point between the concave surface and the tip of the pin moves during a tilting process in which the concave surface is pressed against the tip of the pin and the lever is tilted, and
the lever has a central longitudinal axis, and the reference axis is tilted with respect to the central longitudinal axis of the lever.

2. The cutting tool according to claim 1, wherein the reference axis is tilted in a direction such that the reference axis intersects the central longitudinal axis of the lever closer to the head of the lever than to the concave surface.

3. The cutting tool according to claim 2, wherein a central axis of the pin is tilted in a direction such that a side of the tip portion is farther from the head than a horizontal axis orthogonal to a vertical axis of the lever accommodating hole.

4. The cutting tool according to claim 1, wherein the lever has a projecting portion between the head and the concave surface and the projecting portion protrudes to a side opposite to a side where the concave surface is provided with respect to the central axis of the lever.

5. The cutting tool according to claim 1, wherein the lever is provided with a notch portion having a width larger than a diameter of the tip portion of the pin, the notch portion extending from a concave portion which includes the concave surface to a bottom surface of the lever.

* * * * *